(12) United States Patent
Strange et al.

(10) Patent No.: US 8,772,398 B2
(45) Date of Patent: Jul. 8, 2014

(54) LINERLESS PREPREGS, COMPOSITE ARTICLES THEREFROM, AND RELATED METHODS

(75) Inventors: Andrew C. Strange, Worthington, OH (US); James E. McGuire, Jr., Columbus, OH (US)

(73) Assignee: Entrotech Composites, LLC, Columbus, OH (US)

( * ) Notice: Subject to any disclaimer, the term of this patent is extended or adjusted under 35 U.S.C. 154(b) by 991 days.

(21) Appl. No.: 12/066,263

(22) PCT Filed: Sep. 27, 2006

(86) PCT No.: PCT/US2006/037880
§ 371 (c)(1),
(2), (4) Date: Mar. 8, 2008

(87) PCT Pub. No.: WO2007/038673
PCT Pub. Date: Apr. 5, 2007

(65) Prior Publication Data
US 2008/0299395 A1    Dec. 4, 2008

Related U.S. Application Data

(60) Provisional application No. 60/721,401, filed on Sep. 28, 2005, provisional application No. 60/820,098, filed on Jul. 21, 2006.

(51) Int. Cl.
*C08K 3/34* (2006.01)
(52) U.S. Cl.
USPC .......................................... 524/492; 523/466
(58) Field of Classification Search
USPC .......................................... 524/492; 523/466
See application file for complete search history.

(56) References Cited

U.S. PATENT DOCUMENTS

| | | |
|---|---|---|
| 2,994,005 A | 7/1961 | Goss et al. |
| 4,081,578 A | 3/1978 | Van Essen et al. |
| 4,320,047 A | 3/1982 | Murphy et al. |
| 4,476,293 A | 10/1984 | Robinson |
| 4,684,567 A | 8/1987 | Okamoto et al. |
| 4,748,192 A | 5/1988 | Smith |
| 5,389,435 A | 2/1995 | Yap |
| 5,618,891 A | 4/1997 | Markovitz |
| 5,679,719 A | 10/1997 | Klemarczyk et al. |
| 5,768,285 A | 6/1998 | Griep et al. |
| 5,849,168 A | 12/1998 | Lutz |
| 5,874,151 A | 2/1999 | Cohee et al. |
| 6,007,917 A | 12/1999 | Weigel et al. |
| 6,045,898 A | 4/2000 | Kishi et al. |
| 6,054,221 A * | 4/2000 | Weigel et al. ............ 428/413 |
| 6,063,839 A | 5/2000 | Oosedo et al. |
| 6,287,696 B1 | 9/2001 | Noda et al. |
| 6,383,644 B2 | 5/2002 | Fuchs |
| 6,410,127 B1 | 6/2002 | Kamae et al. |
| 6,515,081 B2 | 2/2003 | Oosedo et al. |
| 6,518,389 B1 | 2/2003 | Kaufhold et al. |
| 6,755,757 B2 | 6/2004 | Sutherland |
| 7,005,103 B2 | 2/2006 | Smith et al. |
| 2004/0044147 A1 | 3/2004 | Kamae et al. |
| 2007/0142548 A1 | 6/2007 | Nejhad et al. |
| 2008/0213490 A1 | 9/2008 | Strange et al. |

FOREIGN PATENT DOCUMENTS

| | | | |
|---|---|---|---|
| WO | WO-2007/038674 | | 4/2007 |
| WO | WO2009041333 | * | 4/2009 |

OTHER PUBLICATIONS

"EPON Resin 862 Product Bulletin," Resolution Performance Products (Houston, TX) RP:4048 (Mar. 2005).
"Epoxy Curing Agents and Modifiers: Ancamine 2441 Curing Agent," Air Products and Chemicals (Allentown, PA) Publication No. 125-04-017-GLB (2004).
"CAB-O-SIL TS-720," Cabot Corporation (Billerica, MA) PDS-141 (Jan. 2006).
"Epoxy Curing Agents and Modifiers: Amicure CG-1200 Curing Agent," Air Products and Chemicals (Allentown, PA) Publication No. 125-9416.7.
"Epoxy Curing Agents and Modifiers: Amicure UR Curing Agent," Air Products and Chemicals (Allentown, PA) Publication No. 125-9416.11.
"EPON Resin 828 Product Bulletin", Resolution Performance Products (Houston, TX) RP:3075-01 (Apr. 2002).
"EPON Resin Structural Reference Manual-EPON Resins-EPI-CURE Curing Agents-Heloxy Modifiers," Resolution Performance Products (Houston, TX), pp. 3i to 3-6 (2001).
"EPON Resin 863 Technical Data Sheet," Hexion Specialty Chemicals (Houston, TX) RP:4041 (Jun. 2004).
Castro, Jose M., "Development of an Environmentally Friendly Solventless Process for Electronic Prepregs," *J. Appl. Polym. Sci.*, 2003, 91(2), pp. 1136-46 (2004).
"D.E.R. 332 Liquid Epoxy Resin Product Information Sheet," Dow Chemical Company, Form No. 296-01447-0106X-TD.

(Continued)

*Primary Examiner* — Edward Cain
(74) *Attorney, Agent, or Firm* — The Griffith Law Firm, A P.C.; Lisa M. Griffith

(57) ABSTRACT

Linerless prepreg, composite articles therefrom, and related methods are disclosed. In linerless prepreg according to the invention, matrix material is impregnated into a reinforcement material without the need for any release liners during manufacture or storage thereof. Beneficially, prepreg of the invention is capable of being easily wound into a roll or stacked for storage, without sticking to itself when it is later used in the manufacture of composite articles.

27 Claims, 3 Drawing Sheets

(56) References Cited

OTHER PUBLICATIONS

"Diethylenetriamine (EPI-CURE Curing Agent 3223)and Triethylenetetramine (EPI-CURE Curing Agent 3234)," *EPON Resin Structural Reference Manual*, Appendix 1, Resolution Perfromance Products, pp. 12-1 thru 12-5 (2001).

Sheppard, M. et al., "Lightweight, Damage Tolerant Composite Sandwich Structures for High Temperature Applications in Aircraft Engine Components," SAMPE Technical Conference (Dayton, OH) (Sep. 2003).

Wang, Zhi et al., "Processing and Property Investigation of Single-Walled Carbon Nanotube (SWNT) Buckypaper/Epoxy Resin Matrix Nanocomposites," *Composites Part A: Applied Science and Manufacturing*, 35(10), pp. 1225-32 (Jun. 5, 2004)—Abstract Only.

Graham, Kelly, "Solventless Prepreg Manufacturing Process," www.circuitree.com (Mar. 1, 2002).

"EPON Resins and Modifiers," Resolution Performance Products SC:3059-01 (2002).

"EPON Resins-Liquid Epoxy Resins and Resin Blends," Resolution Performance Products (May 31, 2002).

* cited by examiner

LINERLESS PREPREGS, COMPOSITE ARTICLES THEREFROM, AND RELATED METHODS

CROSS-REFERENCE TO RELATED APPLICATIONS

This application is a U.S. National Stage of PCT Patent Application No. PCT/US06/37880, filed on Sep. 27, 2006, which claims the benefit of U.S. Provisional Patent Application No. 60/820,098, filed on Jul. 21, 2006, and U.S. Provisional Patent Application No. 60/721401, filed on Sep. 28, 2005.

BACKGROUND OF THE INVENTION

The present invention relates generally to linerless prepregs and composite articles made therefrom, as well as methods of making and using the same.

"Composite materials" and "composite articles" made therefrom are based on at least one reinforced matrix material, for example, a fiber-reinforced polymeric resin. The combination of the matrix material (e.g., resin) and the reinforcing material (e.g., fibers) often produces extremely strong articles that are also lightweight. Thus, composite materials are finding increased use in applications where lightweight materials are desired and where an associated compromise in strength or stiffness of the material would likely be problematic. Many composite materials are also useful in applications where corrosion resistance is desired, as composite materials more often exhibit excellent corrosion resistance as compared to alternative materials.

Due to their beneficial properties, a variety of specialized sporting implements and other articles are increasingly being made from composite materials. For example, composite materials are increasingly being used in manufacturing shaft-based sporting implements (i.e., those sporting implements having a generally elongated portion, which may or may not be hollow or uniform in thickness and shape throughout) and similar articles. Such articles include, for example, golf clubs, bicycle frames, hockey sticks, lacrosse sticks, skis, ski poles, fishing rods, tennis rackets, arrows, polo mallets, and bats. As an example, the use of composite materials enables golf club manufacturers to produce shafts having varying degrees of strength, flexibility and torsional stiffness.

In addition, a variety of articles in the transportation and energy industries are increasingly being made from composite materials. For example, composite materials are often used to make various aerospace components, such as wing and blade components, including those on helicopters and specialized military aircraft. Further, composite materials are often used to make various automotive components, both interior and exterior, including body panels, roofs, doors, gear shift knobs, seat frames, steering wheels, and others. In the energy industry, composite materials are used to make wind mill blades—e.g., large wind turbine blades are made more efficient through the use of carbon fiber-reinforced composites. Indeed, the number of current and potential applications for composite materials is extensive.

One method of manufacturing composite articles is termed a "wet" process, which involves the use of prepreg. "Prepreg" refers to pre-impregnated composite reinforcement material, where the prepreg contains an amount of matrix material used to bond the reinforcement material together and to other components during manufacture.

Exemplary matrix materials include epoxy resins, phenolic resins, bismaleimide resins, polyimide resins and other thermosetting resins. Epoxy resins tend to be the most common. While the prepreg can contain any suitable reinforcement material, fibrous reinforcement is common. Such reinforcement can be continuous or discrete. Exemplary forms of continuous fiber reinforcement include those containing woven, mat, random, or uni-directional fibers. Typical fibrous reinforcement materials include carbon fibers, glass fibers, aramid fibers, boron fibers, polyethylene fibers, and others.

During manufacture of composite articles therefrom, prepreg is typically provided in roll form, where a sheet of prepreg can be cut from the roll. In many instances, the matrix material is a thermosettable resin that has not been fully cured. Thus, in composite article manufacturing, prepreg containing uncured thermosettable resin is often layered and/or wrapped around a preform or mold. Then, heat and/or pressure is applied to cure (i.e., crosslink) the thermosettable resin of the prepreg. Once the matrix material is cured, the composite article has essentially the desired shape, and the reinforcement material is locked into position by the cured matrix material.

Generally, prepreg is manufactured separately from the composite articles made therefrom. When prepreg is provided to a composite manufacturer, it is typically assembled with one or more release liners, which must be removed prior to manufacturing composite articles therefrom. Typically, release liners are paper-based or polymeric film-based materials (e.g., polyethylene) containing a low surface energy coating (e.g., silicone-based coating) on at least one side thereof to provide release properties.

Release liners prevent the prepreg from sticking to itself when, for example, stacked in sheet form or rolled onto a core. In some instances, especially when the prepreg is supplied in roll form, sticking may even prevent the prepreg from being unwound without destroying or significantly distorting the reinforcement material within the prepreg.

Prepreg is typically manufactured using one of two different methodologies: (1) solution method, and (2) film transfer method. During one embodiment of the solution method of manufacturing, the reinforcement material is passed through a bath of uncured matrix material in solution form. The coated reinforcement material is then passed through an oven to partially cure the matrix material (often known as B-staging the material) and/or to remove any solvents that may have been used in coating the matrix material. After exiting the oven as a prepreg, a release liner is laminated to at least one side of the coated reinforcement material. The prepreg assembly can then be easily wound onto a core for later use.

In an alternative embodiment of the solution method of manufacturing, the uncured matrix material is coated directly onto a release liner. The reinforcement material is then positioned within the uncured matrix material coating, after which the assembly is passed through an oven to partially cure the matrix material and/or remove solvents. After exiting the oven as a prepreg, a second release liner is laminated to the opposite side of the assembly from that having the first release liner. The prepreg assembly can then be easily wound onto a core for later use.

In either version of the solution manufacturing method, all steps can be and are desirably performed as part of a continuous process. For example, FIG. 1 schematically illustrates one variation of a continuous solution method for manufacture of prepreg, where the reinforcement material is passed through a bath of uncured matrix material. As illustrated therein, a reinforcement material 110 is unwound and passed through a bath of matrix material 112 before passing through nip rollers 114. Thereafter, the coated reinforcement material 116 is passed by various heating elements 118 within an oven 120. After exiting the oven 120, release liners 122 and 124 are assembled on opposite sides of the partially cured assembly 126 (i.e., a partially cured matrix material containing a reinforcement material) to form a prepreg assembly 128. The prepreg assembly is then wound onto a core 130 for storage and later use.

As another example, FIG. 2 schematically illustrates another variation of a continuous solution method for manufacture of prepreg where the uncured resin material is coated directly onto a release liner. As illustrated therein, a first release liner 210 is unwound and passed adjacent a matrix material reservoir 212, which dispenses matrix material thereon. Thereafter, a reinforcement material 214 is laminated to the matrix material of the coated assembly 216 by passing the entire assembly 218 through an oven 220 after contacting the reinforcement material 214 therewith. After exiting the oven 220, a second release liner 222 is added to the laminated prepreg assembly 224 on the opposite side as that containing the first release liner 210. The prepreg 226 is passed through nip rollers 238 and then wound onto a core 230 for storage and later use.

According to the film transfer method, matrix material is coated onto a first release liner. A second release liner is then laminated onto the opposite side of the matrix material to form a matrix film. Then, during a separate manufacturing step, one of the first and second release liners is removed from the assembly to expose the matrix material. Next, reinforcement material is laminated to the matrix material using heat and pressure. The heat of this lamination step acts to partially cure the matrix material. Finally, a third release liner is laminated to the resulting prepreg assembly opposite from the other release liner. The prepreg assembly can then be wound onto a core for later use.

The film transfer manufacturing method can occur in two separate continuous steps. For example, FIGS. 3A and 3B illustrate two such steps in a film transfer method for manufacture of prepreg. The first continuous step, a film production step, is illustrated in FIG. 3A. A first release liner 310 is unwound and passed under a matrix material reservoir 312, which dispenses matrix material onto the release liner 310 through a coating head 314. Thereafter, a second release liner 316 is unwound and laminated onto the assembly on the side opposite from the first release liner 310. The resulting film of matrix material 318 is then wound onto a roll 320 for use in the second step.

The second continuous step, a film transfer step, is illustrated in FIG. 3B. The film of matrix material 318 is unwound and contacted on one side, where one of the release liners 310 and 316 has been removed, with a reinforcement material 322 that is then contacted with another film of matrix material 318 for lamination using a source of heat 324 and a source of pressure 326. After lamination, the second film of matrix material 318 added to the assembly is removed and replaced by another release liner 328, after which the assembly is passed through nip rollers 330. The resulting prepreg assembly 332 is then wound onto a core 334 for storage and later use.

Many conventional prepregs are made using solvent-based methods (e.g., solution methods). When using solvent-based methods, viscosity of the resin material is decreased by the addition of sufficient amounts of solvent to enable adequate impregnation of the reinforcement material. The solvent is typically removed subsequently via heating. While this method facilitates impregnation of the reinforcement material without the use of heat, the use of solvents makes the process more expensive, less environmentally friendly, and potentially hazardous. Furthermore, the use of a solvent-based method can result in the undesirable retention of solvent within the final prepreg. During subsequent cure of the prepreg, residual solvent is prone to volatilization (e.g., upon heating). Volatilization of the solvent can create unwanted voids within the resulting composite article. Additionally, the need for heating may also preclude certain curing agents from being utilized in the matrix material, thus limiting design flexibility.

Hot-melt processing is an alternative method that has been used when forming conventional prepregs. "Hot-melt processing" refers to processing of essentially 100% solid systems. "Hot-melt processable" refers to those systems that can be, but are not required to be, processed using hot-melt processing techniques. Usually, hot-melt processable systems have no more than about 5% organic solvents or water, more typically no more than about 3% organic solvents or water. Most typically, such systems are free of organic solvents and water. Not surprisingly, methods of this type are often preferred over solvent-based methods. However, because conventional prepregs are often based on matrix materials having a relatively high viscosity, heat in excess of 60° C. is often needed to sufficiently reduce the viscosity so that the matrix material can adequately infiltrate the reinforcement material during formation of the prepreg using hot-melt processing techniques. When the matrix material includes a curative that is heat-activated, hot-melt processing may result in premature cure thereof if not handled appropriately. Thus, the type of curative used can make it impractical to heat the matrix material to the temperature necessary for imparting the desired processing viscosity.

In addition to issues associated with solvent-based and hot-melt processing methods, there are several disadvantages associated with manufacturing and using a prepreg with one or more release liners. Generally, any release liners present are ultimately removed and discarded during subsequent composite article manufacturing. As such, the presence of the release liners serves no functional purpose in the final composite article and only adds cost to the prepreg. Further, the release liners are generally removed from the prepreg manually during composite article manufacturing. This can often be a time-consuming process, especially since gloves usually need to be worn by those handling prepregs. In addition, release liners often contain a silicone-based release coating or other coating containing release agents, which can lead to contamination in the final composite article and assemblies thereof. Further, such contamination can cause layers of prepreg-derived reinforcement to delaminate in final composite articles.

By far, the potential for silicone contamination (or contamination from other release agents) is the most alarming issue associated with using prepregs having one or more release liners assembled therewith. For example, to create a silicone-based release coating for a release liner, a silicone-based material is typically coated and then cured (i.e., crosslinked) onto a substrate (e.g., polymeric film or paper). Notwithstanding the best manufacturing techniques, there is always the potential for uncured silicone contaminants to remain in the resulting release liner. Silicone contaminants can be transferred to the uncured matrix material within a prepreg and, ultimately, into the final composite article and further assemblies made therefrom. The presence of silicone or other types of release agent contaminants can cause reinforcement layers made from the prepreg within the composite article to delaminate, possibly rendering the composite article useless. Delamination can have particularly catastrophic consequences when the article is used in critical structural applications (e.g., in the aerospace industry).

Even when release agent contamination is not a concern, the use of a release liner is generally undesirable. As discussed, the use of a release liner decreases process efficiency when preparing composite articles based on prepregs assembled with one or more release liners that need to be removed during manufacture of the composite article. Efficiency is reduced both in terms of time and cost, which can vary considerably depending on chemistry of the release liner. For example, polymeric release liners are often made from fluoro-polymers due to their inherently good release properties. However, the price of such fluoropolymer release liners is often about five to ten times the cost of traditional silicone-based release liners.

Thus, for many reasons, there is a need to eliminate release liners from prepreg assemblies used in manufacturing composite articles. It is also desirable to provide alternative methods for preparation of prepregs as compared to conventional solvent-based and hot-melt processes.

BRIEF SUMMARY OF THE INVENTION

The present invention relates to linerless prepreg, composite articles therefrom, and related methods. In linerless prepreg according to the invention, matrix material is impregnated into a reinforcement material without the need for any release liners during manufacture or storage thereof. Beneficially, prepreg of the invention is capable of being easily wound into a roll or stacked for storage, without sticking to itself when it is later used in the manufacture of composite articles.

Advantageously, the matrix material from which the prepreg is manufactured is formulated so that movement of the matrix material between or within layers is minimized. This assists in maintaining the matrix-to-reinforcement ratio of the prepreg at a relatively constant value throughout a given prepreg or individual layers within a roll or stack thereof. If the matrix-to-reinforcement ratios throughout a prepreg or between individual layers within a roll or stack are substantially different, manufacturing defects (e.g., resin voids) can occur when manufacturing composite articles therefrom.

Additionally, further advantages of the invention include elimination of potential silicone or other release agent contamination and improved manufacturing efficiency (e.g., cost- and time-efficiency). For example, the often cumbersome step of removing release liners from a prepreg when preparing composite articles therefrom is eliminated. As a further example, the material cost associated with release liners is eliminated. Still further, costs associated with ovens or similar heating sources needed for removal of solvent during manufacture of the prepreg are reduced or eliminated in further embodiments of the invention.

According to one embodiment of the invention, a resin composition for preparation of a composite article comprises: an initial thermosetting resin having a viscosity of less than about 6 Pa·s when tested at 25° C.; at least one curative for the thermosetting resin; and at least one viscosity modifier; wherein the resin composition is capable of impregnating a reinforcement material to form a prepreg capable of being used to form the composite article without use of release liners; and wherein the resin composition is capable of remaining impregnated throughout the reinforcement material, without partial curing, until final cure of the resin composition to form the composite article. In a further embodiment, the initial thermosetting resin has a viscosity of about 2.5 Pa·s to about 4.5 Pa·s when tested at 25° C. According to one aspect of this embodiment, the initial thermosetting resin comprises at least one resin based on diglycidyl ether of Bisphenol F. In an exemplary embodiment, the resin composition is hot-melt processable.

In an exemplary embodiment, the viscosity modifier comprises a thixotropic agent. For example, the viscosity modifier comprises fumed silica according to one aspect of the invention. In another exemplary embodiment, the viscosity modifier comprises a nanomaterial. While the nature and amount of viscosity modifier used can vary, in a preferred embodiment about 2% to about 7% by weight of the total resin composition comprises one or more viscosity modifiers. Preferably, the resin composition also exhibits Bingham plastic fluid behavior.

According to one embodiment, the curative facilitates cure of the resin composition within about 45 to about 60 minutes when heated to about 120° C. Exemplary curatives include those selected from an amine curative and a dicyandiamide. Other components, including at least one elastomeric toughening component, and can be included in resin compositions of the invention.

While a wide variety of reinforcement material can be used in linerless prepregs of the invention, the reinforcement material comprises a fibrous reinforcement material according to one embodiment. Prepregs of the invention thus comprise reinforcement material and resin composition impregnated throughout the reinforcement material. As prepregs of the invention do not generally require B-staging, in one embodiment of such prepregs the resin composition is essentially uncured. Advantageously, prepregs of the invention are capable of being manufactured and stored without the use of release liners. For example, a linerless prepreg of the invention comprises a reinforcement material and a matrix material, wherein a layer of the linerless prepreg is capable of being stacked adjacent another layer of the linerless prepreg or rolled upon itself without significantly sticking to the adjacent linerless prepreg layer or itself when used in manufacture of a composite article therefrom. In one embodiment, an amount of force required to separate adjacent stacked layers of the linerless prepreg is less than about 3 N/cm, preferably less than about 1 N/cm, as measured according to a 180-degree peel angle test conducted at a testing speed of 30 cm/min (12 in/min). When used to make composite articles, the resin composition is cured.

A method of preparing a prepreg of the invention comprises: providing the resin composition and impregnating the reinforcement material with the resin composition to form the prepreg. In an exemplary embodiment of this method, the resin composition is impregnated throughout the reinforcement material without the use of solvent. According to another exemplary embodiment of this method, the resin composition remains essentially uncured until fully curing the prepreg to form a composite article. When preparing a composite article, a method for doing the same comprises assembling the prepreg into a desired shape and curing the resin composition of the prepreg to form the composite article in essentially the desired shape.

DETAILED DESCRIPTION OF THE INVENTION

Figure 1:
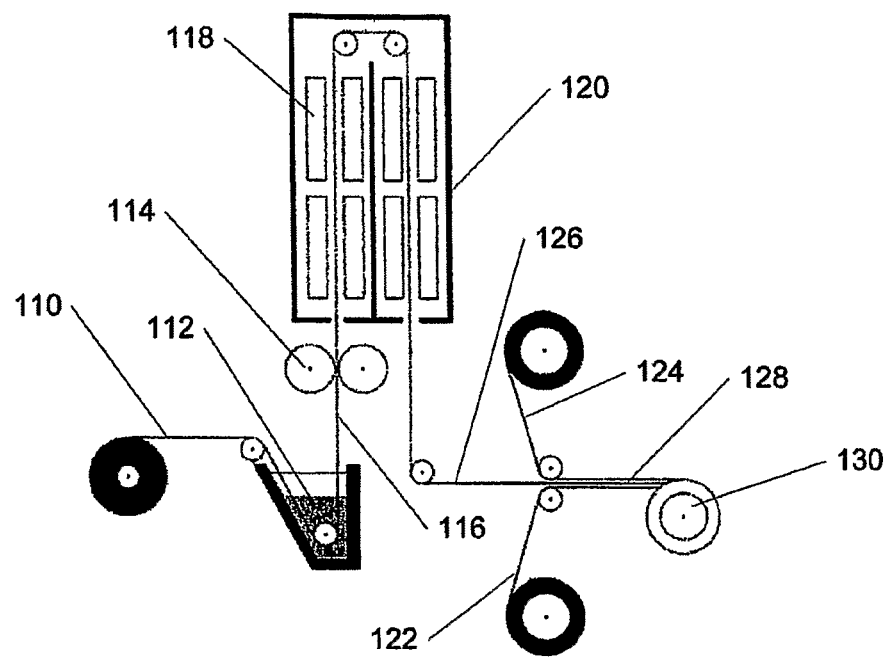
FIG. 1 is a schematic representation of a prior art continuous solution method for manufacture of prepreg, where the reinforcement material is passed through a bath of matrix material.
Figure 2:
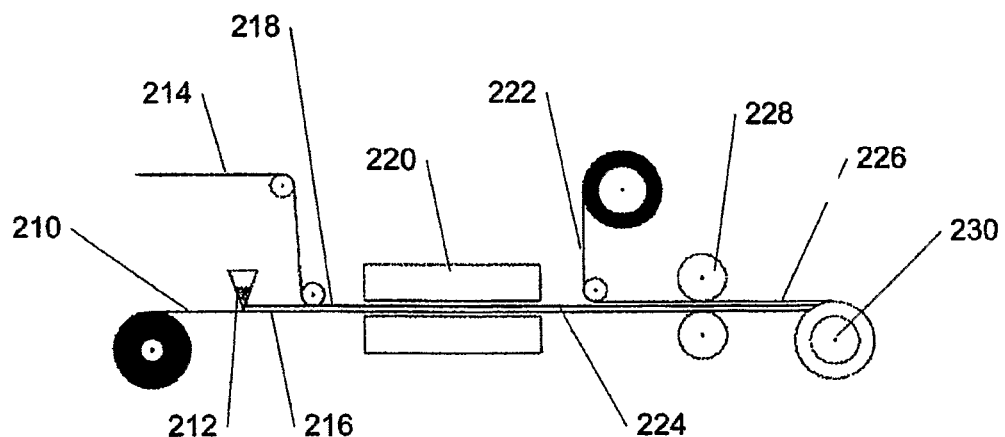
FIG. 2 is a schematic representation of a prior art continuous solution method for manufacture of prepreg, where the matrix material is coated directly onto a release liner.
Figure 3A:
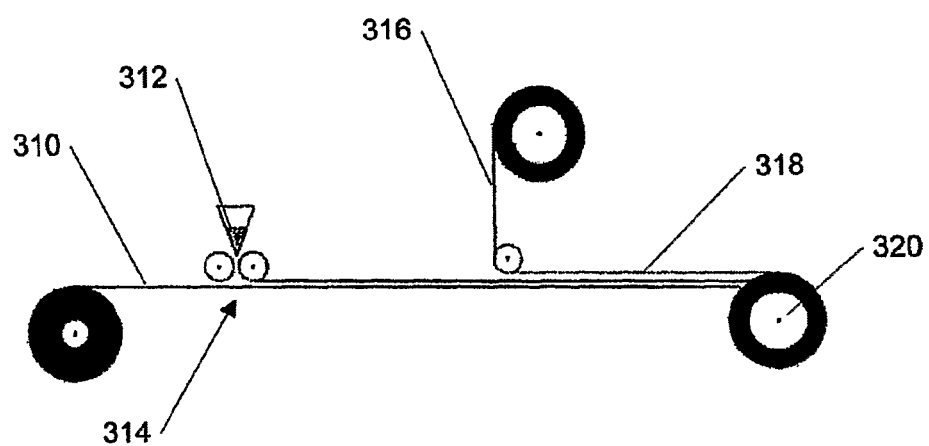
FIG. 3A is a schematic representation of the first step in a two-step prior art film transfer method for manufacture of prepreg.
Figure 3B:
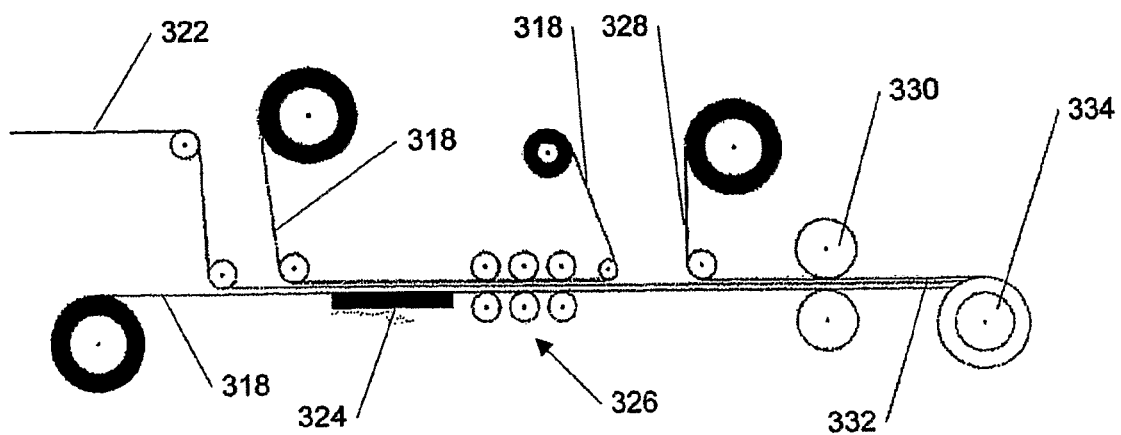
FIG. 3B is a schematic representation of the second step in a two-step prior art film transfer method for manufacture of prepreg.

Generally speaking, the matrix material of a prepreg should possess at least three desirable features. First, while the reinforcement material is being impregnated with the matrix material, the matrix material should be capable of sufficiently flowing in order to adequately coat the reinforcement material and fill interstices throughout the reinforcement material network.

Second, the matrix material should be capable of remaining impregnated at desired levels throughout the reinforcement material. In other words, the matrix material must have sufficient viscosity so as to resist flowing out of the prepreg when, for example, wound onto a core under tension and pressure. If this occurs, composite articles prepared therefrom can have local defects caused by low matrix content or even matrix voids therein.

Third, when the prepreg is ultimately cured during manufacture of a composite article, which is often performed under heat and pressure, the matrix material should resist flowing out of the prepreg. Such undesirable flow can result in local defects caused by low matrix content or even matrix voids therein. When heated, most matrix materials will naturally decrease in viscosity until curing (i.e., crosslinking) begins to occur. To some degree, this decrease in viscosity and resulting flow can be advantageous because there is an additional opportunity for the matrix material to flow throughout the reinforcement material and fill any remaining voids in the prepreg or between layers of prepreg. If the flow of matrix material is too great, however, new voids may actually be created as the matrix material flows out of the reinforcement material network.

Advantageously, matrix materials of the invention possess sufficient viscosity for adequate and stable impregnation of a reinforcement material. Further, matrix materials of the invention possess an inherently low tack, which allows for the resulting prepreg to be easily wound into a roll or stacked for storage and later easily unwound or unstacked for use without requiring use of release liners.

In order to facilitate obtainment of the three desired features noted above, either a matrix material having a relatively high viscosity at room temperature or a matrix material that is in a semi-solid state at room temperature have been conventionally used. Such high viscosity materials have the advantage of resisting flow out of a resulting prepreg, but adequate initial impregnation of the reinforcement material therein can be difficult. As such, solvent is typically utilized to dilute the matrix material, thereby lowering its viscosity. The solvent can then be removed from the system by passing the prepreg through an oven during manufacture thereof. Nevertheless, when solvent is added to a system, the matrix material typically becomes very tacky. As such, a release liner is generally needed to enable the prepreg to be stacked or wound onto itself during roll-to-roll prepreg manufacturing processes. Even if solvent is driven from the prepreg before it is wound onto itself as it passes through an oven, heating of such systems acts to B-stage the matrix material. B-staged systems are also initially very tacky and prepregs therefrom cannot be easily stacked or wound onto themselves without using a release liner.

To avoid the need to dilute a matrix material using a solvent, at least one low viscosity matrix material could be used as the matrix material, as such materials are capable of more easily impregnating the reinforcement material. Conventionally, however, such a matrix material must be B-staged in order to prevent excessive flow of the matrix material during manufacture of composite articles therefrom. Again, however, by B-staging the matrix material, it becomes tacky and prepregs therefrom cannot be easily stacked or wound onto themselves without using a release liner.

According to the invention, an initial matrix material having relatively low viscosity (in contrast to properties of traditional matrix materials used to impregnate reinforcing materials during preparation of prepregs) is adapted for preparation of prepregs according to the present invention. Unlike many conventional matrix materials, those of the invention have viscosities needed for effective impregnation of reinforcement material during manufacture of prepreg. This is accomplished without negatively impacting the matrix material's ability to remain sufficiently dispersed throughout the reinforcement material until subsequent cure thereof. As such, benefits are realized during shipping and storage of prepregs of the invention due to their relative stability as compared to what would be expected based on the use of relatively low viscosity resins. Still further, when curing such prepregs, undesired run-out of the matrix material from the reinforcement material is minimized. In other words, the matrix material is essentially "flow-stable" during cure.

In a further embodiment, the initial matrix material also has relatively low tack as compared to traditional matrix materials typically used. According to one aspect of this further embodiment, a solvent is not used to reduce viscosity of the matrix material. According to another aspect of this further embodiment, matrix materials of the invention do not require B-staging to achieve desired features. Thus, according to this further embodiment, prepregs therefrom have minimal tack and can be easily wound into a roll and unwound or stacked and un-stacked without significantly sticking to adjacent layers.

Preferably, the amount of force required to separate adjacent layers of stacked prepreg from one another is less than about 3 N/cm as measured according to a 180-degree peel angle test conducted at a testing speed of 30 cm/min (12 in/min). More preferably, the amount of such force is less than about 2 N/cm as so measured. Even more preferably, the amount of such force is less than about 1 N/cm as so measured.

According to one embodiment of the invention, the matrix material comprises a resin system. As the initial resin used to impregnate reinforcement material during preparation of prepregs, thermosetting resin and/or thermoplastic resin can be used. As the thermosetting resin, the following are exemplary resins: unsaturated polyester resin, cyanate ester resin, vinyl ester resin, phenol resin, melamine resin, urea resin, diallyl phthalate resin, polyurethane resin, polyimide resin, malemide resin, and silicon resin. As the thermoplastic resin, the following are exemplary resins: polyamide resin, saturated polyester resin, polycarbonate resin, ABS resin, polyvinyl chloride resin, polyacetal resin, polystyrene resin, polyethylene resin, polyvinyl acetate resin, AS resin, methacrylate resin, polypropylene resin, and fluorine resin.

Thermosetting resins and thermoplastic resins can be used singly or in combination as the initial resin. Considering strength and rigidity, however, thermosetting resins are preferable even though processing of thermosetting resins for prepregs is challenging and if not handled correctly, can compromise desired properties of the resultant composite article.

Of the wide variety of useful thermosetting resins, epoxy resins are particularly favorable. The most common epoxy resin types include those based on diglycidyl ether of Bisphenol A and the epoxy novolacs (comprised of glycidyl ethers of cresol novolac, phenolic novolac, or Bisphenol A novolac). However, the present invention provides for use of lower viscosity epoxy resins, such as those based on the diglycidyl ether of Bisphenol F. As compared to a typical epoxy resin based on diglycidyl ether of Bisphenol A (i.e., EPON 826 available from Resolution Performance Products of Houston, Tex.), exemplary lower viscosity epoxy resins of the present invention (i.e., EPON 862 and EPON 863 also available from Resolution Performance Products), which are based on diglycidyl ether of Bisphenol F, are reported to have a viscosity of 2.5-4.5 Pa·s (25-45 Poise) as compared to 6.5-9.6 Pa·s (65-96 Poise) when tested at 25° C. Another example of a Bisphenol F-derived epoxy resin is EPALLOY 8230, available from CVC Specialty Chemicals, Inc. of Moorestown, N.J. The reported viscosity of EPALLOY 8230 epoxy resin is 2.5-4.7 Pa·s (2,500-4,700 centipoise).

In one embodiment, the initial resin has a viscosity of less than about 6 Pa·s (60 Poise) when tested at 25° C. In another embodiment, the initial resin has a viscosity of less than about 5 Pa·s (50 Poise) when tested at 25° C. In another embodiment, the initial resin has a viscosity of about 2.5 Pa·s (25 Poise) to about 4.5 Pa·s (45 Poise) when tested at 25° C.

Generally, when a thermosetting resin is used, a curative is needed to effectuate final cure of the prepreg during manufacture of a composite article therefrom. Any suitable curative can be used in resin systems of the invention. As known to those skilled in the art, different curatives impart various advantages when used. For example, in epoxy systems, aliphatic amine curatives allow for room-temperature cure, whereas aromatic amines offer optimal chemical resistance and more rigid final parts. As another example, acid anhydride curatives can provide superior electrical properties. It is to be understood, however, that selection of the curative depends, among other well known factors, on curing conditions desired and the intended application. In an exemplary embodiment, at least one curative is used that facilitates cure of the resin system within about 45 to about 60 minutes when heated to about 120° C. (250° F.).

An exemplary class of curatives useful for curing of epoxy resins is the modified aliphatic amine curatives, such as those available from Air Products and Chemicals, Inc. of Allentown, Pa. under the ANCAMINE trade designation. In that class, ANCAMINE 2441 curing agent is particularly useful in exemplary resin systems according to the invention.

Another class of curatives includes dicyandiamides, optionally with the use of common accelerators. For example, a useful combination is OMICURE DDA 5, an ultra-micronized grade of dicyandiamide, and OMICURE U-52, an aromatic substituted urea used as an accelerator for dicyandiamide cure of epoxies (both available from CVC Specialty Chemicals, Inc. of Moorestown, N.J.). Another useful combination is AMICURE CG-1400, a micronized grade of dicyandiamide, and AMICURE UR, a substituted urea-based accelerator (1 phenyl 3,3 dimethyl urea) for dicyandiamide-cured epoxy resins (both available from Air Products and Chemicals, Inc. of Allentown, Pa.).

Any suitable amount of the curative is used in resin systems of the invention. Generally, after the specific type of curative is selected, the amount used is calculated as is well known to those skilled in the art.

Relatively low viscosity initial resins used in the invention are adapted for use in preparation of prepregs by addition of one or more viscosity modifiers. Any suitable viscosity modifier can be used in the invention, with the understanding that such viscosity modifiers differ from common diluents.

Common diluents may be included in the resin compositions, but their presence—particularly in significant amounts—is generally not preferred. While common diluents can be used to reduce a resin system's viscosity, their presence in final cured composite articles therefrom may negatively impact performance properties of the composite article due to the tendency of conventional diluents to make cured resins too flexible and soft for some applications. Common diluents include, for example, non-reactive diluents and reactive diluents. Certain reactive diluents include glycidyl ethers and glycidyl esters, including those available from Resolution Performance Products of Houston, Tex. under the trade designation, HELOXY MODIFIER. Exemplary reactive diluents available from Resolution Performance Products include HELOXY MODIFIER 71 (dimer acid diglycidyl ester), HELOXY MODIFIER 107 (cyclohexane dimethanol diglycidyl ether), and HELOXY MODIFIER 505 (castor oil polyglycidyl ether).

In one embodiment, the viscosity modifier comprises a thixotropic agent that increases the viscosity of the initial resin in the overall resin system, yet imparts shear thinning properties as well. When used with a hot-melt process for impregnation of reinforcement material, compositions of this type were capable of displaying particularly preferred viscosity characteristics. An exemplary viscosity modifier for this purpose is fumed silica, such as that available from Cabot Corporation of Billerica, Mass. under the trade designation, CABO-SIL TS-720. Cabot Corporation; PPG Industries of Pittsburgh, Pa. (marketed under the trade designation, HI-SIL); and Degussa Corporation of Parsippany, N.J. (marketed under the trade designation, AEROSIL) also provide fumed silica suitable for use in the present invention. The fumed silica can be treated (e.g., so that it is hydrophobic) or it can be untreated.

In another embodiment, the viscosity modifier comprises a nanomaterial. A nanomaterial is a material generally understood to be readily measurable on the nanoscale. According to one aspect of this embodiment, nanomaterials have a relatively large surface area in relation to their volume. Any suitable nanomaterial can be used as a viscosity modifier according to the present invention. Preferred nanomaterials for use in the present invention include those comprising particles having at least one primary dimension (e.g., diameter, width, or length) of less than about 500 nanometers. As long as one dimension of the particle is less than about 500 nanometers, other dimensions of the preferred nanomaterials may be larger in size. Particularly preferred nanomaterials include those based on carbon—e.g., carbon nanotubes and carbon nanofibers. One example of carbon nanofibers are those available from Applied Sciences, Inc. of Cedarville, Ohio, and marketed under the trade designation, Pyrograf-III.

In addition to their function as viscosity modifiers, nanomaterials may be preferred for certain applications as they are often capable of imparting additional functional properties to the matrix material. For example, nanomaterials can improve the toughness of the cured matrix material. In other instances, nanomaterials can beneficially alter the thermal and/or electrical properties of the cured matrix material. Thus, according to a further aspect of this embodiment of the invention, the nanomaterials serve two purposes—serving as a viscosity modifier and imparting at least one additional functional property to the matrix material.

While having thixotropic properties assists in allowing the matrix material to be coated (i.e., impregnated) into the reinforcement material, thixotropic properties alone may not be sufficient to ensure that the matrix material does not flow out of the reinforcement material when stored in roll form or during subsequent processing. To reduce the possibility that the matrix material could undesirably flow out of the reinforcement material, it should preferably also exhibit Bingham plastic fluid behavior. Matrix materials exhibiting Bingham plastic fluid behavior generally do not flow until a certain threshold stress (i.e., a yield stress) is applied to the material. A common way to observe whether a material exhibits such a yield stress is to invert a jar of the material. If the material does not begin to flow within a few minutes, it can be characterized as exhibiting Bingham plastic fluid properties.

Any number of viscosity modifiers can be combined in varying proportions to form the viscosity modifier component of matrix materials of the invention. The total amount of the viscosity modifier component is that amount effective to increase the viscosity of the initial resin without detrimentally affecting flexibility of the prepreg prior to final cure of the resin system. According to one embodiment of the invention, at least 1% by weight of the total resin system comprises one or more viscosity modifiers. According to a further aspect of this embodiment, about 2% to about 7% by weight of the total resin system comprises one or more viscosity modifiers. In particularly preferred embodiments, about 5% by weight of the total resin system comprises one or more viscosity modifiers.

Other components may be present in resin system of the invention, recognizing that properties of the resin system, prepregs therefrom, and resultant composite articles may be influenced by the type and amount of such components. Adjustments as known to those skilled in the art can be made to achieve results desired for each particular application.

Although glass transition temperature of the resin system can vary across a broad spectrum, in exemplary embodiments of the invention the resin system has a glass transition temperature of less than about 200° C. using Differential Scanning Calorimetry known to those skilled in the art. In further embodiments, the resin system has a glass transition temperature of less than about 175° C. when so measured. In still further embodiments, the resin system has a glass transition temperature of less than about 150° C. when so measured.

In other embodiments, while not necessary for this invention, it may be useful to add conventional detackifying resins to assist in controlling the tack of the matrix material. Such detackifying resins include, for example, waxes, fatty acids, and other release agents. However, such optional additives should be carefully selected if used because, as discussed above, the presence of any release agents or other additives could negatively impact the integrity of the final composite article.

In further embodiments of the invention, it is preferable to add a minor amount of a toughening agent (also referred to as an elastomeric component) to resin systems used in preparation of prepregs of the invention. For example, up to about 10 parts of a rubber toughening agent based on 100 parts by weight of the initial resin can be present in resin systems of the invention. According to further embodiments, up to about 5 parts of a rubber toughening agents based on 100 parts by weight of the initial resin is used. Those of ordinary skill in the art are readily able to select the types and amounts of such toughening agents depending on the properties desired. It is known to those skilled in the art that addition of elastomeric toughening agents generally increases the viscosity of a composition. Advantageously, however, due to the relatively low viscosity of resin systems of the invention as compared to those associated with resins conventionally used in prepregs, one is able to add more of such toughening agents to a resin system before it attains the same viscosity—one where workability is substantially compromised. Thus, formulation latitude is improved in regards to the types and amounts of other components that can be used in resin systems of the invention.

In the case of elastomeric toughening agents, addition thereof often advantageously improves the cured matrix material's fracture toughness. In other embodiments, it may be advantageous to use a functional resin adduct that has been modified with an elastomeric component. Such functional resin adducts are often useful because they can be cross-linked into the primary matrix material in relatively small amounts without modifying the overall cure properties or the viscosity of the matrix material. Examples of such functional resin adducts include epoxy adducts modified with carboxyl-terminated butadiene-acrylonitrile elastomers, such as EPON 58034 and EPON 58042 (available from Hexion Specialty Chemicals, Inc. of Houston, Tex.) or HyPox RF 1320 and HyPox RF 1341 (available from CVC Specialty Chemical, Inc. of Moorestown, N.J.). Additional examples include the elastomeric particulate tougheners available from Zeon Chemicals of Louisville, Ky. (marketed under the trade designation DuoMod).

Manufacture of linerless prepreg according to the invention can occur using any suitable method. Preferably, the method comprises a coating process that adequately impregnates the reinforcement material.

In one embodiment, the method comprises a continuous process, preferably one operating in a controlled and consistent fashion. For example, according to a preferred method of manufacture such as that illustrated in FIG. 4A, reinforcement material 410 is provided in a roll form. During manufacture, the reinforcement material 410 is unwound from the core 412 and passed completely through a bath of matrix material 414. After passing through the bath of matrix material 414, the coated assembly 416 passes between a pair of nip rollers 418 to meter off excess resin in a smooth and consistent fashion. Other implements, such as squeegees, coating bars, other types of rollers, and similar apparatus can be used instead to meter off excess resin. Thereafter, the prepreg 420 is wound into a roll onto another core 422.

In a preferred continuous process, the amount of matrix material impregnated into the reinforcement material is varied by adjusting the line speed and metering technique used. As known by those of ordinary skill in the art, some applications will benefit from a higher ratio of matrix material to reinforcement material, while other applications will benefit from lower such ratios. Further, the nature and structure of the reinforcement material may affect processing conditions needed to achieve the desired ratio. For example, thick, fibrous reinforcement materials will be slightly more difficult to impregnate as compared to thinner, fibrous reinforcement materials and may require running the line at a slower speed.

Figure 4A:
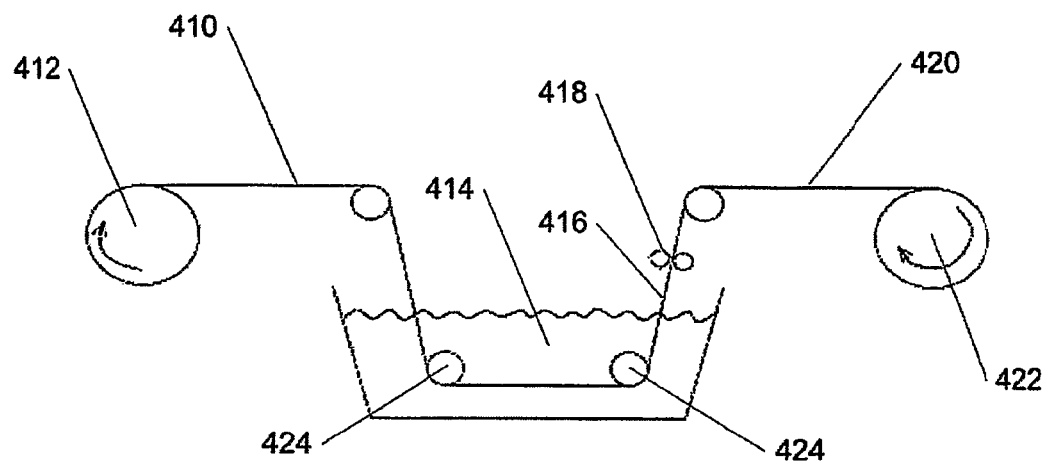
FIG. 4A is a schematic representation of one embodiment of a method for impregnating reinforcement material with matrix material according to the present invention.
Figure 4B:
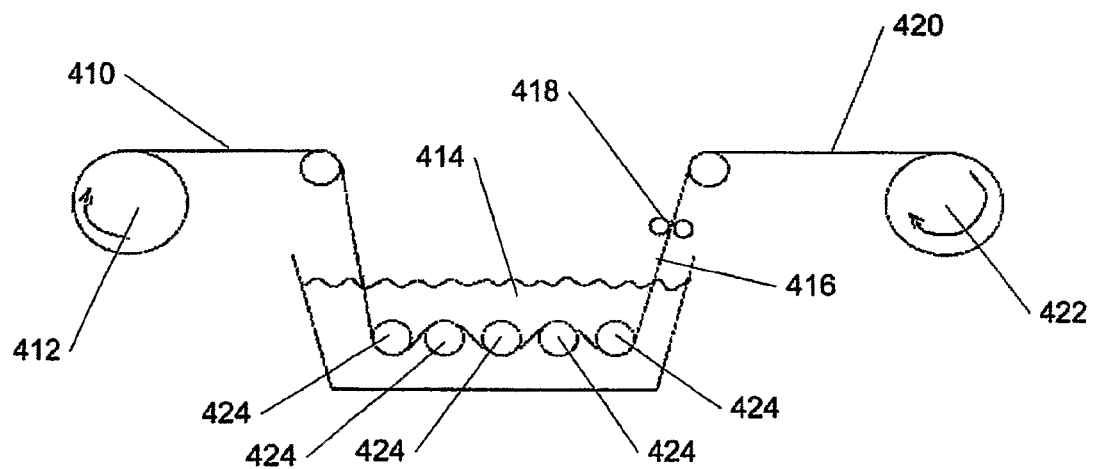
FIG. 4B is a schematic representation of an alternative embodiment of the method for impregnating reinforcement material with matrix material according illustrated in FIG. 4A.

In other embodiments, the reinforcement material is wrapped around multiple objects positioned within a bath of the matrix material to facilitate adequate impregnation. For example, the reinforcement material can be wrapped around several idler rollers while the reinforcement material is still submerged in the resin bath. FIG. 4B illustrates a further embodiment of the method of manufacture illustrated in FIG. 4A, wherein only two such idler rollers 424 are used. In the embodiment illustrated in FIG. 4B, more than two idler rollers 424 (e.g., five in the embodiment illustrated) are used. This increased number of immersed objects allows interstices within, for example, a fibrous reinforcement material to be "opened" and "closed" to allow resin to more easily impregnate the reinforcement material. While idler rollers are illustrated in FIGS. 4A and 4B, it is to be understood that any suitable object can be used for the purpose of facilitating impregnation. For example, in an alternative embodiment of the invention, one or more of the objects positioned within the bath include a set of nip rollers. Nip rollers assist in impregnation by increasing shear of the matrix material, allowing it to be more easily forced into the reinforcing material during the impregnation thereof.

Many other variations to the methods described above will be readily apparent to those of ordinary skill in the art and can be made without departing from the scope and spirit of the invention. For example, the bath of matrix material can be placed under pressure in a closed chamber. When the reinforcement material passes therethrough, the pressurized bath facilitates impregnation by forcing the matrix material into the reinforcement material. In another embodiment, multiple baths of the matrix material are used to facilitate adequate impregnation of the reinforcement material. In yet another embodiment, the reinforcement material can be pre-sprayed or otherwise at least partially contacted with the matrix material before being immersed in a bath of the matrix material.

EXAMPLES

Exemplary embodiments and applications of the invention are described in the following non-limiting examples and related testing methods.

Example 1

A resin system was prepared by mixing 100 parts by weight EPON 863 (an epoxy resin available from Resolution Performance Products of Houston, Tex.) as an initial resin, 22 parts by weight ANCAMINE 2441 (an amine curative available from Air Products and Chemicals, Inc. of Allentown, Pa.), and 5 parts by weight CABO-SIL TS-720 (a fumed silica available from Cabot Corporation of Billerica, Mass.). This composition was impregnated by hand into a 3K carbon fiber weave to form a linerless prepreg according to the present invention.

Two layers of the linerless prepreg were stacked together. A pressure of 1.7 Pa (0.25 psi) was applied to the stacked layers of prepreg for 15 hours, which was intended to approximate the pressure that the prepreg assembly might experience if wound onto itself.

The amount of force required to separate the layers of prepreg from one another thereafter was measured using a peel tester available from IMASS, Inc. of Accord, Mass. under the trade designation SP-2000. The tests were conducted at a 180-degree peel angle and at a testing speed of 30 cm/min (12 in/min). The amount of force required to remove one layer of prepreg from the next layer of prepreg was then measured. Only a minimal amount of force, 0.37 N/cm (0.53 oz/in) was required to separate the layers of prepreg.

Comparative Examples C1-C3

The following comparative examples were prepared using relatively high viscosity initial resins and a solvent for reduction of the resin's viscosity to a point suitable for impregnation. Each resin system was impregnated by hand into a 3K carbon fiber weave to form a prepreg. Prior to stacking, each prepreg was air-dried at room temperature until only a residual amount of acetone remained in the prepreg. Then, without use of any release liners therebetween, two layers of the prepreg were stacked together. A pressure of 1.7 Pa (0.25 psi) was applied to the stacked layers of prepreg for 15 hours, which was intended to approximate the pressure that the prepreg assembly might experience if wound onto itself.

The amount of force required to separate the layers of prepreg from one another thereafter was measured using a peel tester available from IMASS, Inc. of Accord, Mass. under the trade designation SP-2000. The tests were conducted at a 180-degree peel angle and at a testing speed of 30 cm/min (12 in/min). The amount of force required to remove one layer of prepreg from the next layer of prepreg was then measured. As can be seen from the results in Table 1, the peel force required to separate the layers of prepreg was substantially higher when a higher viscosity resin was utilized as the base resin as in Comparative Examples C1-C3 versus the low viscosity resin used in Example 1.

Comparative Example C1 Resin System: A resin system was prepared by mixing 100 parts by weight EPON 834 (a high viscosity Bisphenol A-based epoxy resin available from Resolution Performance Products of Houston, Tex.) as an initial resin, 15 parts by weight ANCAMINE 2441 (an amine curative available from Air Products and Chemicals, Inc. of Allentown, Pa.), and 4 parts by weight acetone.

Comparative Example C2 Resin System: A resin system was prepared by mixing 100 parts by weight EPON 836 (a high viscosity Bisphenol A-based epoxy resin available from Resolution Performance Products of Houston, Tex.) as an initial resin, 17 parts by weight ANCAMINE 2441 (an amine curative available from Air Products and Chemicals, Inc. of Allentown, Pa.), and 9 parts by weight acetone.

Comparative Example C3 Resin System: A resin system was prepared by mixing 100 parts by weight EPON 58901 (a medium viscosity elastomer-modified Bisphenol A-based epoxy resin available from Resolution Performance Products of Houston, Tex.) as an initial resin, 19 parts by weight ANCAMINE 2441 (an amine curative available from Air Products and Chemicals, Inc. of Allentown, Pa.), and 4 parts by weight acetone.

TABLE 1

| Resin System | Room Temperature Viscosity (ASTM D2196 Brookfield Viscometer) of Initial Resin - Pa·s (Poise) | Peel Force to Separate Layers - N/cm (oz/in) |
|---|---|---|
| Example 1 | 2.5 (25) | 0.37 (0.53) |
| Comparative Example C1 | Semi-Solid | 4.60 (6.58) |
| Comparative Example C2 | Semi-Solid | 18.52 (26.45) |
| Comparative Example C3 | 100-500 (1,000-5,000) | 3.38 (4.83) |

Examples 2-4

The following examples were prepared using relatively high viscosity initial resins and a solvent for reduction of the resin's viscosity to a point suitable for impregnation. However, as compared to the similar compositions of Comparative Examples C1-C3, a viscosity modifier was added to each resin system. Each resin system was impregnated by hand into a 3K carbon fiber weave to form a prepreg. Prior to stacking, each prepreg was air-dried at room temperature until only a residual amount of acetone remained in the prepreg. Then, without use of any release liners therebetween, two layers of the prepreg were stacked together. A pressure of 1.7 Pa (0.25 psi) was applied to the stacked layers of prepreg for 15 hours, which was intended to approximate the pressure that the prepreg assembly might experience if wound onto itself.

The amount of force required to separate the layers of prepreg from one another thereafter was measured using a peel tester available from IMASS, Inc. of Accord, Mass. under the trade designation SP-2000. The tests were conducted at a 180-degree peel angle and at a testing speed of 30 cm/min (12 in/min). The amount of force required to remove one layer of prepreg from the next layer of prepreg was then measured. As can be seen from the results in Table 2, despite the presence of a viscosity modifier within the resin system, the peel force required to separate the layers of prepreg was substantially higher when a higher viscosity resin was utilized as the base resin in Examples 2-4 versus the low viscosity resin used in Example 1.

Example 2 Resin System: A resin system was prepared by mixing 100 parts by weight EPON 834 (a high viscosity Bisphenol A-based epoxy resin available from Resolution Performance Products of Houston, Tex.) as an initial resin, 15 parts by weight ANCAMINE 2441 (an amine curative available from Air Products and Chemicals, Inc. of Allentown, Pa.), 4 parts by weight acetone, and 5 parts by weight CABO-SIL TS-720 (a fumed silica available from Cabot Corporation of Billerica, Mass.).

Example 3 Resin System: A resin system was prepared by mixing 100 parts by weight EPON 836 (a high viscosity Bisphenol A-based epoxy resin available from Resolution Performance Products of Houston, Tex.) as an initial resin, 17 parts by weight ANCAMINE 2441 (an amine curative available from Air Products and Chemicals, Inc. of Allentown, Pa.), 9 parts by weight acetone, and 5 parts by weight CABO-SIL TS-720 (a fumed silica available from Cabot Corporation of Billerica, Mass.).

Example 4 Resin System: A resin system was prepared by mixing 100 parts by weight EPON 58901 (a medium viscosity elastomer-modified Bisphenol A-based epoxy resin available from Resolution Performance Products of Houston, Tex.) as an initial resin, 19 parts by weight ANCAMINE 2441 (an amine curative available from Air Products and Chemicals, Inc. of Allentown, Pa.), 4 parts by weight acetone, and 5 parts by weight CABO-SIL TS-720 (a fumed silica available from Cabot Corporation of Billerica, Mass.).

TABLE 2

| Resin System | Room Temperature Viscosity (ASTM D2196 Brookfield Viscometer) of Initial Resin - Pa · s (Poise) | Peel Force to Separate Layers - N/cm (oz/in) |
| --- | --- | --- |
| Example 1 | 2.5 (25) | 0.37 (0.53) |
| Example 2 | Semi-Solid | 4.23 (6.04) |
| Example 3 | Semi-Solid | 9.26 (13.23) |
| Example 4 | 100-500 (1,000-5,000) | 6.59 (9.42) |

Example 5

A resin composition was prepared by mixing 100 parts by weight EPON 862 (an epoxy resin available from Resolution Performance Products of Houston, Tex.), 22 parts by weight ANCAMINE 2441 (an amine curative available from Air Products and Chemicals, Inc. of Allentown, Pa.), and 5 parts by weight CABO-SIL TS-720 (a fumed silica available from Cabot Corporation of Billerica, Mass.). This composition can be impregnated into a reinforcing material to form a linerless prepreg according to the present invention.

Example 6

A resin composition was prepared by mixing 100 parts by weight EPALLOY 8230 (an epoxy resin available from CVC Specialty Chemicals, Inc. of Moorestown, N.J.), 6.6 parts by weight OMICURE DDA 5 (an ultra-micronized grade of dicyandiamide available from CVC Specialty Chemicals, Inc. of Moorestown, N.J.), 0.55 part by weight OMICURE U-52 (an aromatic substituted urea used as an accelerator for dicyandiamide cure of epoxies and available from CVC Specialty Chemicals, Inc. of Moorestown, N.J.), and 5 parts by weight CABO-SIL TS-720 (a fumed silica available from Cabot Corporation of Billerica, Mass.). This composition can be impregnated into a reinforcing material to form a linerless prepreg according to the present invention.

Example 7

A resin composition was prepared by mixing 100 parts by weight EPON 862 (an epoxy resin available from Resolution Performance Products of Houston, Tex.), 6.6 parts by weight AMICURE CG-1400 (a micronized grade of dicyandiamide available from Air Products and Chemicals, Inc. of Allentown, Pa.), 4.4 parts by weight AMICURE UR (a substituted urea-based accelerator—1 phenyl 3,3 dimethyl urea—for dicyandiamide-cured epoxy resins available from Air Products and Chemicals, Inc. of Allentown, Pa.), and 5 parts by weight CABO-SIL TS-720 (a fumed silica available from Cabot Corporation of Billerica, Mass.). This composition can be impregnated into a reinforcing material to form a linerless prepreg according to the present invention.

Example 8

A resin composition was prepared by mixing 100 parts by weight EPON 862 (an epoxy resin available from Resolution Performance Products of Houston, Tex.), 6.6 parts by weight AMICURE CG-1400 (a micronized grade of dicyandiamide available from Air Products and Chemicals, Inc. of Allentown, Pa.), 4.4 parts by weight (an amine curative available from Air Products and Chemicals, Inc. of Allentown, Pa.), and 5 parts by weight CABO-SIL TS-720 (a fumed silica available from Cabot Corporation of Billerica, Mass.). This composition can be impregnated into a reinforcing material to form a linerless prepreg according to the present invention.

Example 9

A resin composition was prepared by mixing 100 parts by weight EPON 863 (an epoxy resin available from Resolution Performance Products of Houston, Tex.), 23.2 parts by weight ANCAMINE 2441 (an amine curative available from Air Products and Chemicals, Inc. of Allentown, Pa.), 10.0 parts by weight EPON 58034 (an epoxy adduct modified with carboxyl-terminated butadiene-acrylonitrile elastomers available from Hexion Specialty Chemicals, Inc. of Houston, Tex.), and 5.25 parts by weight CABO-SIL TS-720 (a fumed silica available from Cabot Corporation of Billerica, Mass.).

This composition can be impregnated into a reinforcing material to form a linerless prepreg according to the present invention.

Example 10

A resin composition was prepared by mixing 100 parts by weight EPON 863 (an epoxy resin available from Resolution Performance Products of Houston, Tex.), 22.4 parts by weight ANCAMINE 2441 (an amine curative available from Air Products and Chemicals, Inc. of Allentown, Pa.), 2.5 parts by weight of PYROGRAF-III (carbon nanofibers available from Applied Sciences, Inc. of Cedarville, Ohio), and 2.5 parts by weight CABO-SIL TS-720 (a fumed silica available from Cabot Corporation of Billerica, Mass.). This composition can be impregnated into a reinforcing material to form a linerless prepreg according to the present invention.

Examples 11A-11D

A series of resin compositions were prepared by mixing 100 parts by weight EPON 863 (an epoxy resin available from Resolution Performance Products of Houston, Tex.) as an initial resin and 22 parts by weight ANCAMINE 2441 (an amine curative available from Air Products and Chemicals, Inc. of Allentown, Pa.). Additionally, in the amount shown in Table 3, CABO-SIL TS-720 (a fumed silica available from Cabot Corporation of Billerica, Mass.) was added to each resin composition.

Approximately 100 grams of the resin composition was placed into a 240 mL (8 ounce) glass jar under ambient temperature conditions. Then, each jar was inverted for a time period of sixty minutes. During this time period, the resin composition within each jar was visually inspected to determine if any flow occurred. As can be seen from the results in Table 3, resin compositions with higher levels of viscosity modifier (i.e., fumed silica) exhibited Bingham plastic fluid properties according to a preferred embodiment of the invention.

TABLE 3

| Example | Amount of Fumed Silica (parts by weight) | Exhibits Bingham Plastic Fluid behavior? |
| --- | --- | --- |
| 11A | 0 | No - Resin flowed immediately |
| 11B | 1 | No - Resin began flowing within 3 seconds of inverting jar |
| 11C | 3 | Yes - Did not flow |
| 11D | 5 | Yes - Did not flow |

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A resin composition forming an initial matrix material during preparation of a composite article, the composition comprising:
   an essentially uncured initial resin comprising at least one thermosetting resin and, optionally, at least one thermoplastic resin;
   at least one curative for the at least one thermosetting resin; and
   at least one viscosity modifier;
   wherein viscosity of the initial resin in the resin composition is less than about 6 Pa·s when tested at 25° C.;
   wherein the resin composition is capable of impregnating a reinforcement material to form a prepreg capable of being used to form the composite article without use of release liners; and
   wherein the resin composition is capable of remaining impregnated throughout the reinforcement material, without partial curing, until final cure of the resin composition to form the composite article.

2. The resin composition of claim 1, wherein the initial resin has a viscosity of about 2.5 Pa·s to about 4.5 Pa·s when tested at 25° C.

3. The resin composition of claim 1, wherein the initial resin comprises at least one resin based on diglycidyl ether of Bisphenol F.

4. The resin composition of claim 1, wherein the reinforcement material comprises a fibrous reinforcement material.

5. The resin composition of claim 1, wherein the viscosity modifier comprises a thixotropic agent.

6. The resin composition of claim 5, wherein the resin composition exhibits Bingham plastic fluid behavior.

7. The resin composition of claim 1, wherein the resin composition exhibits Bingham plastic fluid behavior.

8. The resin composition of claim 1, wherein the viscosity modifier comprises fumed silica.

9. The resin composition of claim 1, wherein the viscosity modifier comprises a nanomaterial.

10. The resin composition of claim 1, wherein about 2% to about 7% by weight of the total resin composition comprises one or more viscosity modifiers.

11. The resin composition of claim 1, wherein the curative facilitates cure of the resin composition within about 45 to about 60 minutes when heated to about 120° C.

12. The resin composition of claim 1, wherein at least one curative is selected from an amine curative and a dicyandiamide.

13. The resin composition of claim 1, further comprising at least one elastomeric toughening component.

14. The resin composition of claim 1, wherein the resin composition is hot-melt processable.

15. A prepreg comprising:
   the reinforcement material of claim 1; and
   the resin composition of claim 1 impregnated throughout the reinforcement material.

16. The prepreg of claim 15, wherein the resin composition is essentially uncured.

17. The prepreg of claim 15, wherein the prepreg is manufactured and stored without the use of release liners.

18. A composite article derived from the prepreg of claim 15, wherein the resin composition is cured.

19. A linerless prepreg comprising:
   a reinforcement material; and
   a matrix material,
   wherein a layer of the linerless prepreg is capable of being stacked adjacent another layer of the linerless prepreg or rolled upon itself without significantly sticking to the adjacent linerless prepreg layer or itself when used in manufacture of a composite article therefrom.

20. A linerless prepreg comprising:
   a reinforcement material; and
   a matrix material,
   wherein a layer of the linerless prepreg is capable of being stacked adjacent another layer of the linerless prepreg or rolled upon itself without significantly sticking to the adjacent linerless prepreg layer or itself when used in manufacture of a composite article therefrom, and, wherein an amount of force required to separate adjacent stacked layers of the linerless prepreg is less than about 3 N/cm as measured according to a 180-degree peel angle test conducted at a testing speed of 30 cm/min (12 in/min).

21. The linerless prepreg of claim 20, wherein the amount of force is less than about 1 N/cm.

22. A method of preparing a prepreg, comprising:
providing the resin composition of claim 1; and
impregnating the reinforcement material of claim 1 with the resin composition of claim 1 to form the prepreg.

23. The method of claim 22, wherein the resin composition is impregnated throughout the reinforcement material without the use of solvent.

24. The method of claim 22, wherein the resin composition remains essentially uncured until fully curing the prepreg to form a composite article.

25. A method of preparing a composite article, comprising:
assembling the prepreg of claim 15 into a desired shape; and
curing the resin composition of the prepreg to form the composite article in essentially the desired shape.

26. The resin composition of claim 1, wherein the initial resin consists of thermosettable resin.

27. The resin composition of claim 1, wherein thermosettable resin in the initial matrix material consists of the initial resin having a viscosity of less than about 6 Pa·s when tested at 25° C.

* * * * *